United States Patent [19]

Jellesma

[11] 4,212,745

[45] Jul. 15, 1980

[54] BELT FILTER

[75] Inventor: Anne Jellesma, Sneek, Netherlands

[73] Assignee: Machinefabriek W. Hubert & Co. B.V., Sneek, Netherlands

[21] Appl. No.: 940,599

[22] Filed: Sep. 8, 1978

[30] Foreign Application Priority Data

Sep. 13, 1977 [NL] Netherlands .......................... 7710048

[51] Int. Cl.² ............................................. B01D 33/04
[52] U.S. Cl. .................................................. 210/401
[58] Field of Search ............... 210/160, 370, 400, 401; 162/351, 353, 364, 366, 352, 374

[56] References Cited

U.S. PATENT DOCUMENTS

| | | | |
|---|---|---|---|
| 2,314,294 | 3/1943 | Wallny | 210/401 |
| 2,888,378 | 5/1959 | Maguire | 162/351 |
| 2,893,486 | 7/1959 | Marti | 162/352 |
| 3,066,068 | 11/1962 | Calehuff et al. | 162/352 |
| 3,105,817 | 10/1963 | Seibert | 162/374 |
| 3,438,854 | 4/1969 | Means | 162/352 |
| 3,876,500 | 4/1975 | Csordas et al. | 162/351 |

FOREIGN PATENT DOCUMENTS 570501   7/1945   United Kingdom ..................... 210/401

*Primary Examiner*—Frank Sever
*Attorney, Agent, or Firm*—Wilkinson, Mawhinney & Theibault

[57] ABSTRACT

Belt filter comprising a filter belt within a frame and a discharge casing connected with a suction device situated therebelow, the discharge casing comprising elements protruding from the bottom towards the filter belt supporting at least one meshed conveyor belt likewise to be driven longitudinally, and being narrower than the filter belt, such that the edges of the filter belt sealingly adjoin the outwardly diverging side edges of the discharge casing.

2 Claims, 2 Drawing Figures

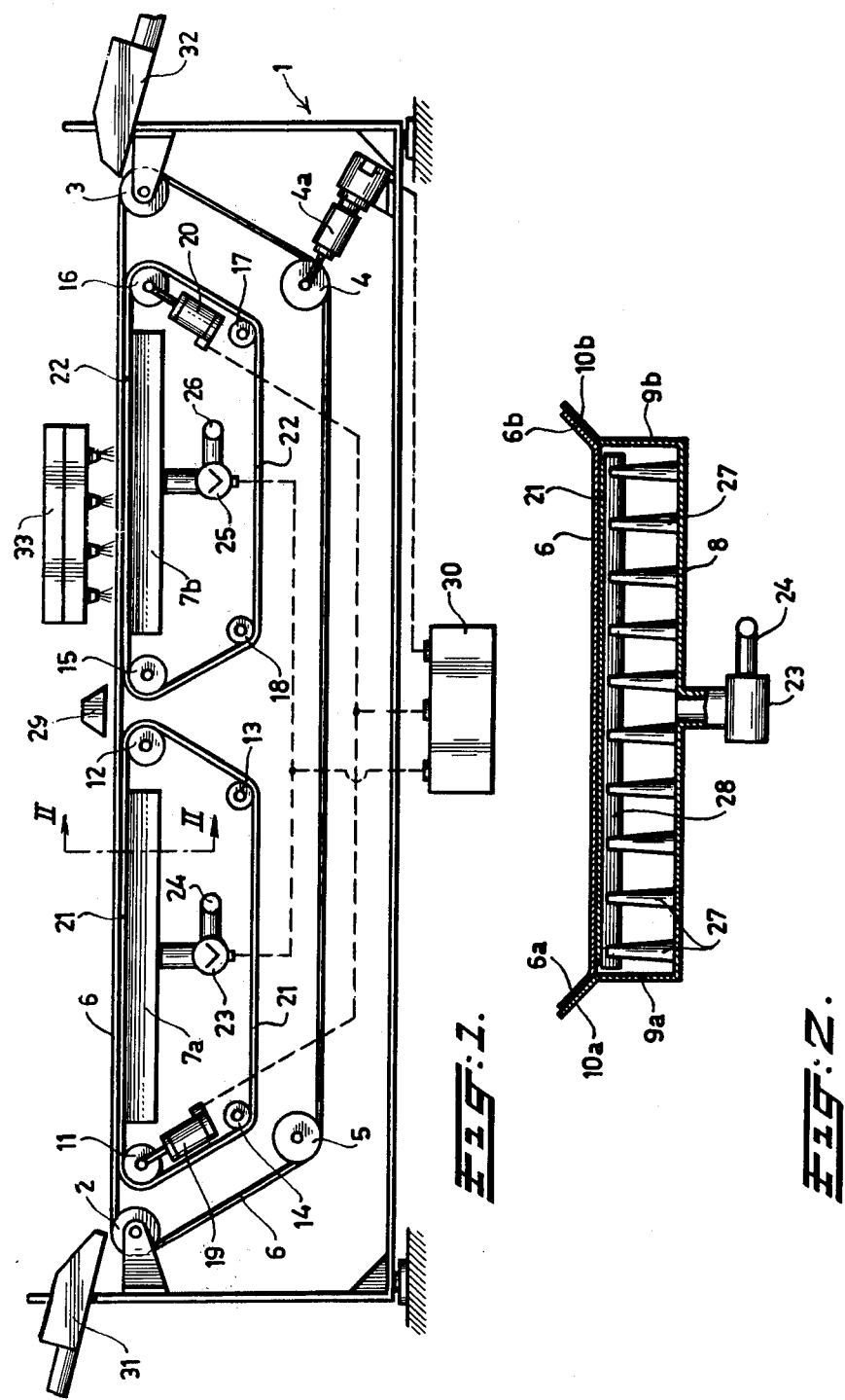

BELT FILTER

TECHNICAL FIELD

The invention relates to a belt filter, comprising a longitudinal filter belt within a frame, driven by means of a drive, and discharge casing connected with a suction device situated therebelow.

Such a filter is for instance disclosed in the German Auslegeschrift 1,131,188. Said known filter is disadvantageous owing to its complicated construction: the discharge casing and the belt filter must perform a definite stroke together during which vacuum is sucked into the discharge casing. After the completion of the stroke of the discharge casing between both ends of the frame, the drive of belts and discharge casing has to be interrupted and the discharge casing has to retake its initial position, whereafter a new cycle can start. This filter requires a complicated seal.

DISCLOSURE OF INVENTION

The invention provides a belt filter with a considerably simpler construction. According to the invention the discharge casing is fixedly secured within the frame and is provided with elements protruding from the bottom of the casing of the filter belt, upon which rests at least one conveyor belt for the filter belt to be driven longitudinally and provided with meshes, said conveyor belts being narrower than the filter belt proper, thus that the edges of the filter belt sealingly adjoin the outwardly diverging side edges of the discharge casing.

The conveyor belt serves for supporting the drive and for the drainage of the filter belt; when a long filter belt is used the forces required for driving this belt are considerable in the known filter, so that an optimum dimensioning of the filter belt for the filtering operation is no longer possible but, the measures according to the invention make an optimum dimensioning of the belt as regards the functions thereof possible; as a material for the filter belt a material having an optimum filtration capacity can be used, this material can be very flexible so that the sides of same can rest upon the sides of the discharge casing to obtain a perfect seal.

It is possible to use a plurality of interspaced aligned conveyor belts. The spaces in between can be used to house gauging and detection apparatus e.g. for determining the ratio of drainage or minerals or metals present in the filter cake.

The mutual distances of the elements protruding towards the filter belt preferably exceed the mesh width of the conveyor belt bearing thereupon, the mesh width of the conveyor belt being larger than that of the filter belt. In this manner sagging of the filter belt and a deformation incurring therewith, is prevented owing to the fact that there is a sufficient support; the transition from the filter mesh to the background is stepwise which considerably improves the filter action.

In a filter as described hereinabove both belts can be driven continuously; the discharge device and the belt drive may, however, be driven intermittently, such that the discharge device is operating when the belts stop and reverse.

BRIEF DESCRIPTION OF DRAWINGS

The invention will be clarified with respect to the drawing. In the drawing is:

FIG. 1 a schematic side view of an embodiment according to the invention;
FIG. 2 a section across the line II—II in FIG. 1.

BEST MODE OF CARRYING OUT THE INVENTION

FIG. 1 is a very schematic view of the filter according to the invention and, shows a frame 1 supporting the rollers 2, 3, 4 and 5. The roller 4 of said rollers is driven by a transmission-motor combination 4a, while a filter belt 6 is slung around said rollers. Within the frame two discharge casings 7a, 7b are mounted; FIG. 2 shows a cross section of the discharge casing 7a which, as can be seen from the figure, consists of a base 8 and transverse wall parts 9a, 9b which extend towards the outwardly diverging wall parts 10a, 10b. The width of the belt 6 is such that the sides of same, reference 6a, 6b, sealingly adjoin the diverging wall parts 10a, 10b.

The frame 1 further comprises two sets each with four rollers, to wit a set consisting of the rollers 11, 12, 13, 14 and a set consisting of the rollers 15, 16, 17, 18. The roller 11 is driven by a motor 19 and the roller 16 by a motor 20. Around the first sets of rollers 11 to 14 inclusive a conveyor belt 21 is slung, and a conveyor belt 22 is likewise slung around the second set of rollers 15 to 18 inclusive. The conveyor belt 21 is shown in FIG. 2. The filter belt 6 is supported by the conveyor belts. In between the rollers 11 and 12 a discharge casing 7a is mounted within the frame and in between the rollers 15 and 16 a discharge casing 7b is likewise mounted within the frame. The discharge casing 7a is connected with an outlet 24 through a vacuum pump 23; the discharge casing 7b is connected with an outlet 26 through a vacuum pump 25. Each discharge casing 7a, 7b comprises a number of supporting elements, as illustrated in FIG. 2 for the discharge casing 7a. Said supporting members consist of longitudinal elements 27 upwardly directed from the base and interconnected with each other at their upper edges via transverse ribs 28. The upper edges of the elements 27 combined with the transverse ribs 28, support the respective conveyor belts 21, 22. The dimensions are chosen thus that the meshes between the upright elements 27 and the ribs 28 are larger than the meshes of the conveyor belt 21, the meshes of the latter surpassing again the sizes of the filter belt 6 proper. The same applies to the combination of the discharge casing 7b with filter belt 22. The above identified features result into an extremely effective support of the filter belt upon the conveyor belt and of the conveyor belt upon the discharge casing, enabling the dimensions of these three elements to be chosen such that an optimum action is warranted, as well as an optimum drainage of the filter belt.

A device 29 can be placed in spaces between the rollers 12 and 15, so at the point where the filter belt 6 does not bear upon the conveyor belts 21, 22. Said device 29 can be used for a determination of the compound or cake present upon the filter belt, for example minerals, metals and the like or the ratio of drainage within the filter cake.

The motor transmission units 19 and 20, the motor transmission unit 5 and the vacuum pumps 23 and 25 are connected with a central drive 30 which controls the operation of the different parts of the device, e.g. by means of a cam switch driven by a clock motor. The filter device can be operated continuously but also enables an operation whereby vacuum is sucked into the discharge casings 7a and 7b when the belts stop, while the belts move when no vacuum is sucked into the discharge casings 7a and 7b. The device further comprises an inlet 31 as schematically illustrated, for supplying the filter belt 6 with material to be filtered, and a likewise schematically illustrated outlet 32 for the filter cake. There may also be a schematically shown moisturing device 33, while it is possible to combine the filter with a pressing filter.

The figure shows an embodiment wherein the conveyor belt is subdivided into two parts which may facilitate the drive in certain circumstances, especially when large dimensions are used. An embodiment comprising one single discharge casing, eventurally subdivided into a plurality of compartments, mounted below the filter belt and combined with a single conveyor belt, may however also be used.

What I claim is:

1. A belt filter apparatus comprising:
   (a) a filter belt mounted within the apparatus frame supported by at least one longitudinally driven conveyor belt,
   (b) a suction casing with opposite upstanding longitudinal side walls and a spaced bottom pan which enclose the conveyor belt further comprising a plurality of aligned interposed conveyor belts,
   (c) supporting elements upstanding from the bottom of said casing; wherein said supporting elements in said suction casing have mutual distances closer than the mesh width of said conveyor belt bearing thereon, said mesh widths being larger than those of said filter belt,
   (d) the distance between said supporting elements being greater than the mesh of said conveyor belt which is greater than the mesh of said filter belt,
   (e) the upstanding side walls of said suction casing being the level of said conveyor belt which diverge outwardly into flared side edges which include a shallow angle with the transverse width of said filter belt and which sealingly support the edges of said filter belt which lie above and to both outer sides of said conveyor belt.

2. A belt filter apparatus as claimed in claim 1 further comprising a discharge device and belt drive device operating intermittently when said conveyor belt stops and visa versa.

* * * * *